US012726635B2

(12) United States Patent
Wang et al.

(10) Patent No.: US 12,726,635 B2
(45) Date of Patent: Sep. 1, 2026

(54) RESTRICTED REGION OF INTRA PREDICTION TO SUPPORT PARALLEL PROCESSING

(71) Applicant: Tencent America LLC, Palo Alto, CA (US)

(72) Inventors: Biao Wang, San Jose, CA (US); Lien-Fei Chen, Hsinchu (TW); Roman Chernyak, Santa Clara, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 9 days.

(21) Appl. No.: 18/912,561

(22) Filed: Oct. 10, 2024

(65) Prior Publication Data

US 2025/0126270 A1 Apr. 17, 2025

Related U.S. Application Data

(60) Provisional application No. 63/544,164, filed on Oct. 14, 2023.

(51) Int. Cl.
*H04N 19/105* (2014.01)
*H04N 19/132* (2014.01)
(Continued)

(52) U.S. Cl.
CPC ......... *H04N 19/159* (2014.11); *H04N 19/132* (2014.11); *H04N 19/176* (2014.11); *H04N 19/70* (2014.11)

(58) Field of Classification Search
CPC .. H04N 19/159; H04N 19/132; H04N 19/176; H04N 19/70
(Continued)

(56) References Cited

U.S. PATENT DOCUMENTS

2017/0094271 A1 3/2017 Liu et al.
2024/0305815 A1* 9/2024 Ahn .................... H04N 19/105
(Continued)

FOREIGN PATENT DOCUMENTS

WO WO-2024235731 A1 * 11/2024 ............ H04N 19/52

OTHER PUBLICATIONS

International Search Report and Written Opinion received for PCT Patent Application No. PCT/US2024/051249, mailed on Dec. 9, 2024, 9 pages.

*Primary Examiner* — Albert Kir
(74) *Attorney, Agent, or Firm* — ARENTFOX SCHIFF LLP

(57) ABSTRACT

Aspects of the disclosure includes methods and apparatuses for video decoding and video encoding and a method of processing visual media data. A current block in a first coding tree unit (CTU) is predicted using samples in a current picture. The first CTU and a second CTU are processed in parallel. The method for video decoding includes determining one of (i) a reference block of the current block in an allowed search range that is constrained for parallel processing of the first CTU and the second CTU in the current picture and (ii) an intra prediction mode of the current block based on a template adjacent to the current block that is constrained for parallel processing of the first CTU and the second CTU, and reconstructing the current block using the one of (i) the reference block and (ii) the intra prediction mode.

18 Claims, 13 Drawing Sheets

(51) Int. Cl.
*H04N 19/159* (2014.01)
*H04N 19/176* (2014.01)
*H04N 19/70* (2014.01)

(58) Field of Classification Search
USPC .................................................... 375/240.13
See application file for complete search history.

(56) References Cited

U.S. PATENT DOCUMENTS

2025/0126270 A1* 4/2025 Wang .................. H04N 19/593
2025/0247522 A1* 7/2025 Chen .................. H04N 19/167
2025/0254334 A1* 8/2025 Wang .................. H04N 19/463

* cited by examiner 1321
1360
1365
1360
1312
1313
1301
1311

RESTRICTED REGION OF INTRA PREDICTION TO SUPPORT PARALLEL PROCESSING

RELATED APPLICATION

The present application claims the benefit of priority to U.S. Provisional Application No. 63/544,164, filed on Oct. 14, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding.

According to an aspect of the disclosure, a method for video decoding includes receiving a bitstream including coded information of a current block in a first coding tree unit (CTU) that is predicted using samples in a current picture. The first CTU and a second CTU are processed in parallel. The method for video decoding includes determining one of (i) a reference block of the current block in an allowed search range that is constrained for parallel processing of the first CTU and the second CTU in the current picture and (ii) an intra prediction mode of the current block based on a template that is adjacent to the current block that is constrained for parallel processing of the first CTU and the second CTU, and reconstructing the current block using the one of (i) the reference block of the current block and (ii) the intra prediction mode of the current block.

In an aspect, a method for video encoding includes determining one of (i) a reference block of a current block in an allowed search range that is constrained for parallel processing of a first coding tree unit (CTU) and a second CTU in a current picture and (ii) an intra prediction mode of the current block based on a template that is adjacent to the current block that is constrained for parallel processing of the first CTU and the second CTU, and encoding the current block using the one of (i) the reference block of the current block and (ii) the intra prediction mode of the current block. The current block in the first CTU is predicted using samples in the current picture.

In an aspect, a method of processing visual media data includes processing a bitstream of the visual media data according to a format rule. The bitstream includes a syntax element indicating that a current block in a first coding tree unit (CTU) is predicted using samples in a current picture. The first CTU and a second CTU are processed in parallel. The format rule specifies that: determining one of (i) a reference block of the current block in an allowed search range that is constrained for parallel processing of the first CTU and the second CTU in the current picture and (ii) an intra prediction mode of the current block based on a template that is adjacent to the current block that is constrained for parallel processing of the first CTU and the second CTU is performed, and the current block is reconstructed using the one of (i) the reference block of the current block and (ii) the intra prediction mode of the current block.

Aspects of the disclosure also provide an apparatus for video encoding. The apparatus for video encoding including processing circuitry configured to implement any of the described methods for video encoding.

Aspects of the disclosure also provide an apparatus for video decoding. The apparatus for video decoding including processing circuitry configured to implement any of the described methods for video encoding.

Aspects of the disclosure also provide a non-transitory computer-readable medium storing instructions which, when executed by a computer, cause the computer to perform any of the described methods for video decoding/encoding.

Technical solutions of the disclosure include aspects directed to allowing parallel processing of multiple units (e.g., coding tree units (CTUs)) in a current picture using a method A (e.g., a wavefront parallel processing or WPP) and thus improving coding efficiency. When a current block in a first CTU is predicted using samples in a current picture using a method B, one of (i) a reference block of the current block in a search range and (ii) an intra prediction mode of the current block based on a template that is adjacent to the current block may be determined. The search range or the template may include top-right samples of the current block. When the first CTU and a second CTU in the current picture are to be processed in parallel, in some examples, a portion of the top-right samples of the current block may be excluded from the search range or the template such that the first CTU and the second CTU in the current picture may be processed in parallel. For example, if the second CTU is located at the top-right of the first CTU, when the portion of the top-right samples of the current block are in the second CTU, the portion of the top-right samples of the current block may not be available to predict the current block, and thus imposing constraint on the search range or the template so that the portion of the top-right samples of the current block are not included in the search range or the template allows the parallel processing of the multiple CTUs.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
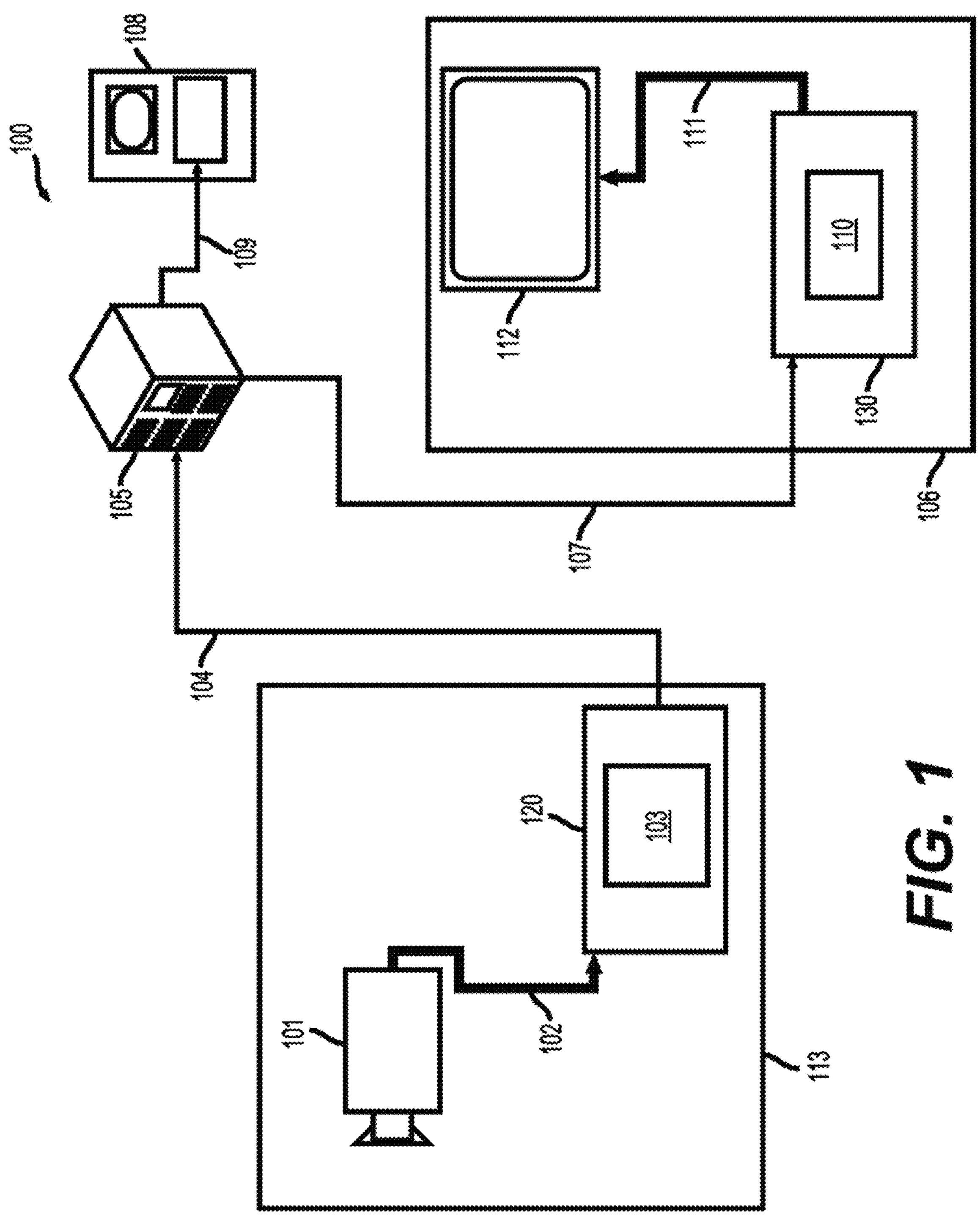
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
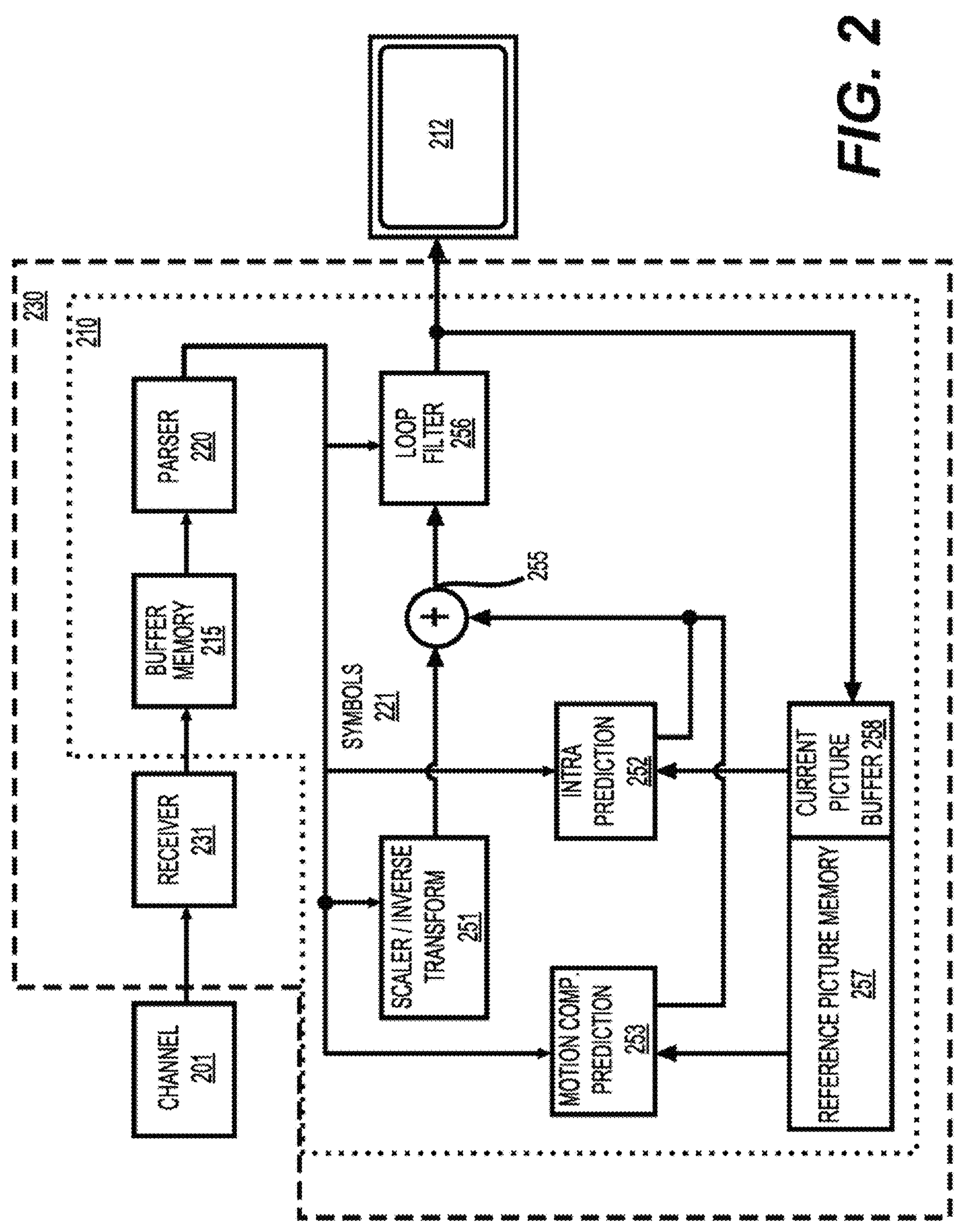
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
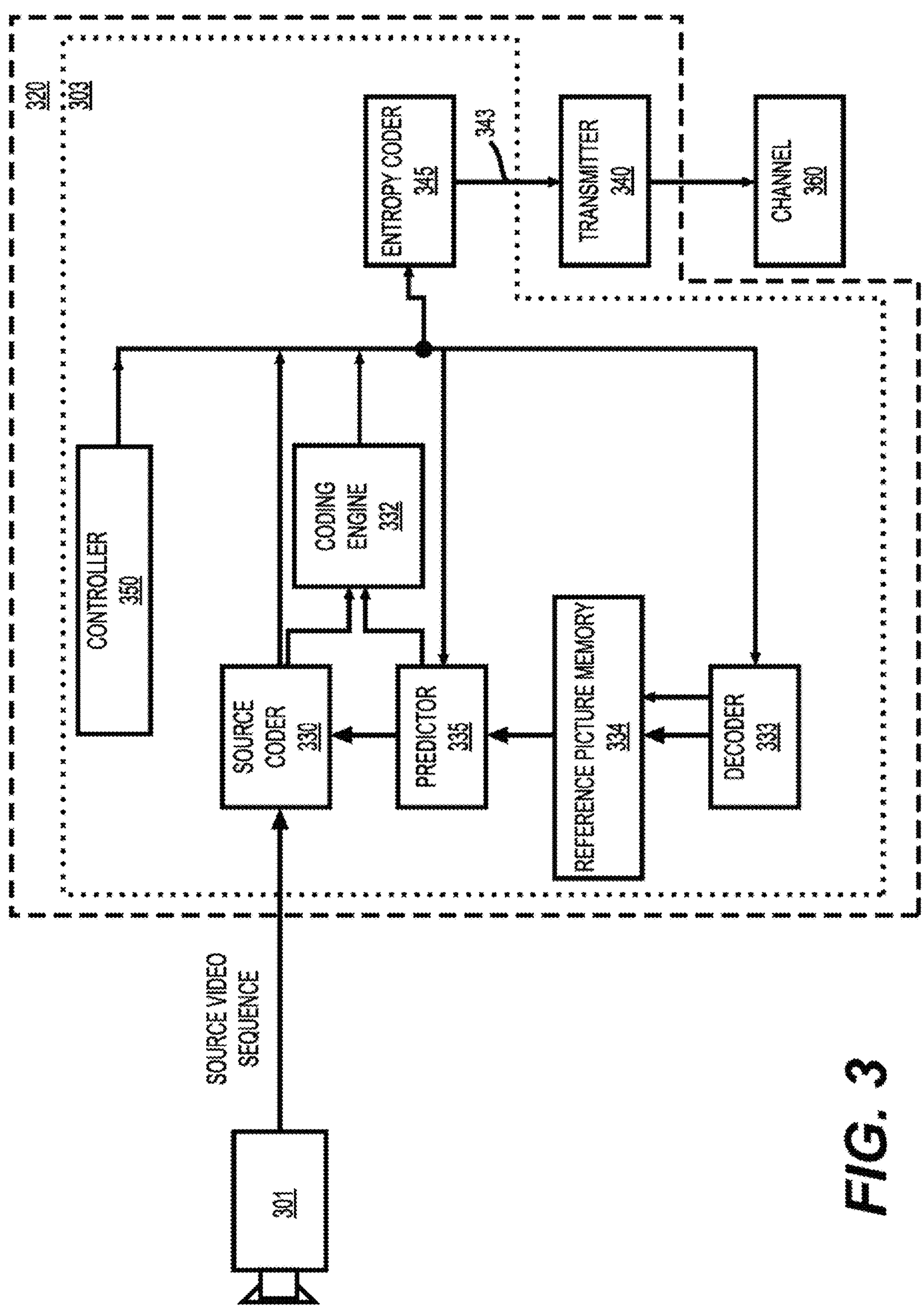
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may include temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure describe a set of methods for video and/or image compression, for example, including video and/or image compression methods related to intra prediction mode coding, and a restricted region of intra prediction to support parallel processing.

Video coding has been widely used in many applications. Various video coding standards such as H264, H265, H266 (or VVC), AV 1, and AVS have been widely adopted. In an aspect, a video codec may include multiple modules, including intra/inter prediction, transform coding, quantization, entropy coding, in loop filtering, and the like. Intra prediction may be one of the main modules, and may include signaling processing methods (e.g., signaling processing methods) and neural network-based methods.

Figure 4:
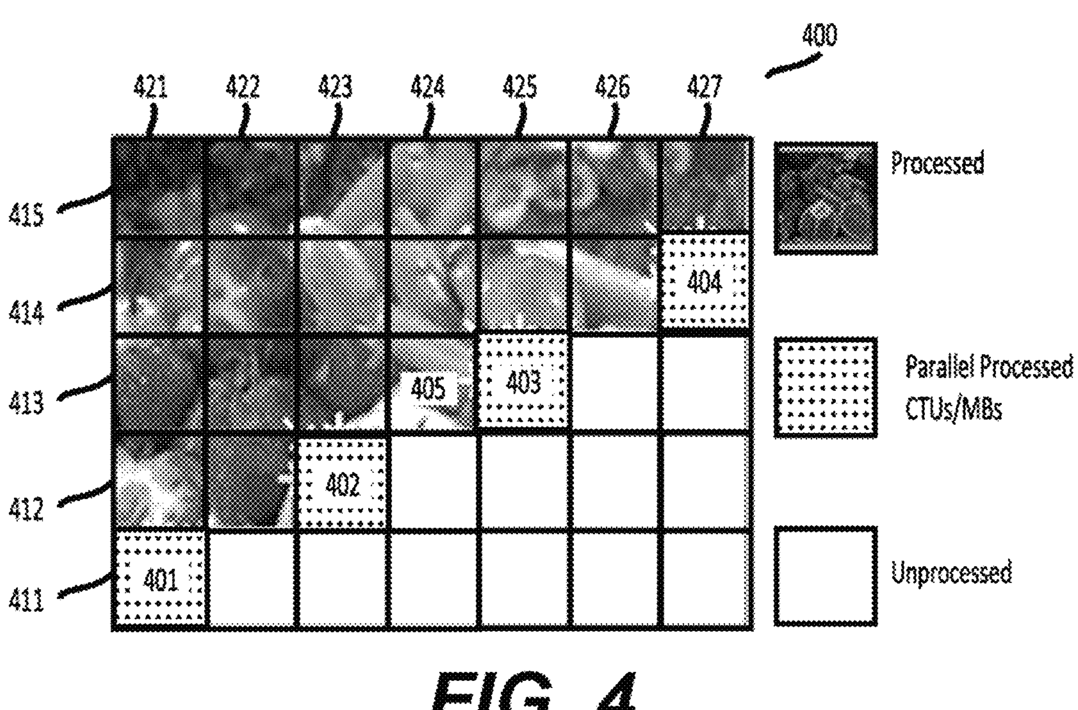
FIG. 4 shows an example of a parallel processing scheme for video codec according to an aspect of the disclosure.

In an aspect, a parallel processing method (also referred to as a method A for parallel processing) may be used by video coding to support parallel processing of encoding and/or decoding. In an example, the method A includes a wavefront parallel processing (WPP) method. FIG. 4 shows an example of a parallel processing scheme for video codec according to an aspect of the disclosure. Referring to FIG. 4, a picture (400) is being coded (e.g., encoded or decoded). The picture (400) may include multiple units. In an example, each unit is a CTU, and the picture (400) is partitioned into multiple CTUs. In an example, each unit is a macroblock (MB), and the picture (400) is partitioned into multiple MBs. For purposes of brevity, CTUs are used as an example of units in the disclosure and the description may be suitably adapted to other examples of units, such as MBs.

In the parallel processing method, such as the WPP method, different units may be processed in parallel, for example, when a unit (e.g., a CTU) in a current line (e.g., a current row) may be one or more units behind an adjacent line (e.g., a row that is above the current row). Thus, unit(s) used to process (e.g., encode or decode) the unit in the current line may be available, for example, the unit(s) used to process the unit in the current line have already been reconstructed.

For purposes of brevity, FIG. 4 shows an example where units (e.g., CTUs) in different rows may be processed in parallel, for example, using respective threads. The descriptions may be adapted if CTUs in different columns are processed in parallel.

In FIG. 4, different rows of units (without limitation of generality, the different rows may be referred to as CTU rows in the disclosure) may be processed in parallel, provided the encoding/decoding CTU in the current row is at least one CTU (e.g., two-CTUs in FIG. 4) behind the CTU row above. In the example shown in FIG. 4, the coding latency is multiple (e.g., two) CTUs between neighboring rows, because the current CTU (e.g., the CTU (402)) may use reference samples from a top-right CTU (e.g., a CTU (405)) of the current CTU.

Referring back to FIG. 4, the picture (400) may include the multiple CTUs. The CTUs may include processed CTUs that have been processed (e.g., have been encoded or decoded), unprocessed CTUs that are to be processed, and CTUs (401)-(404) that are being processed in parallel. The picture (400) may include multiple CTU rows (411)-(415). Each CTU row may include multiple CTUs in the CTU row. The picture (400) may include multiple CTU columns (421)-(427). Each CTU column may include multiple CTUs in the CTU column. In an example, the CTUs (401)-(404) are in different rows (e.g., the CTU rows (411)-(414)). In an example, CTUs in adjacent CTU rows that may be processed in parallel are separated by a CTU column. For example, the CTUs (401)-(402) in the adjacent CTU rows (411)-(412) are separated by the CTU column (422). The CTUs (401)-(402) may be processed in parallel, for example, are processed independently from each other. In an example, the parallel processing of the CTUs (401)-(404) is performed simultaneously.

Various prediction techniques that predict a current block in a current picture from reference samples in the current picture may be used to predict the current block. A method B may include a prediction technique that predicts the current block in the current picture from reference samples in the current picture. The method B may include an intra template matching prediction (IntraTMP) mode, an intra block copy (IBC) mode, a template-based intra prediction mode derivation (TIMD), a decoder-side intra mode derivation (DIMD), or the like.

Figure 5:
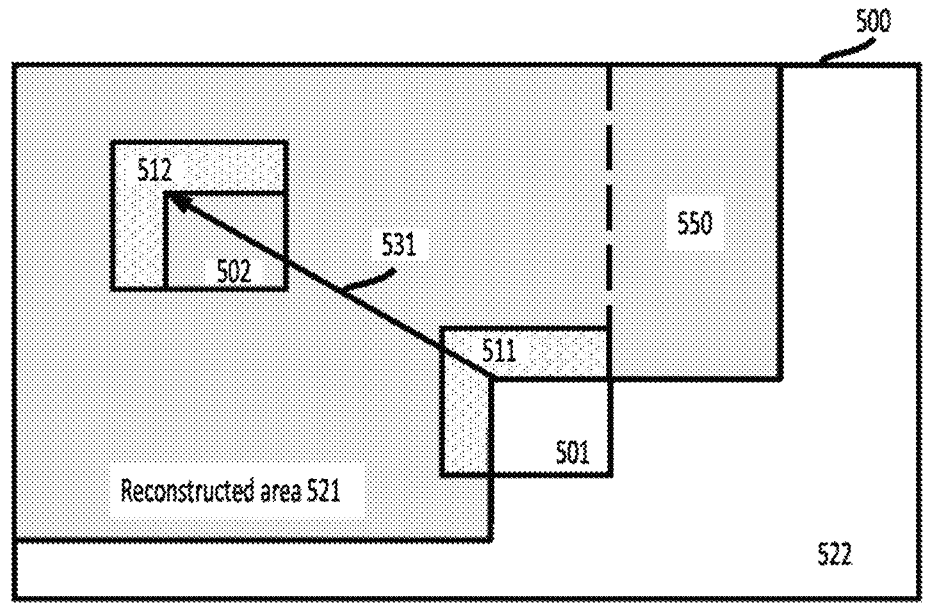
FIG. 5 shows an example of a search area (or a search range) for a current block in a current picture according to an aspect of the disclosure.

In an example, the method B includes an intra prediction technique, such as the IntraTMP mode. FIG. 5 shows an example of a search area (also referred to as a search range) for a current coding block (also referred to as a current block) (501) in a current picture (500) according to an aspect of the disclosure. In an example, the picture (500) includes an area (521) (in gray) that is already coded (e.g., already reconstructed) and an area (522) that is not coded. In an example, the area (521) is referred to as a reconstructed area. In an example, the area (522) is to be coded. In an example, the area (522) includes the current block (501) that is to be coded. In an example, the area (522) does not include the current block (501) that is being coded.

In an example, a predefined coded area may be searched to determine a similar block (e.g., a reference block) (502) to generate a prediction signal of the current block (501), such as in the IntraTMP mode or the IBC mode. In an example, the search area is the predefined coded area. A position of the reference block (502) may be indicated by a block vector (BV) (531), as shown in FIG. 5. The BV (531) may be derived, for example, purely implicitly without any signaling by comparing a similarity (e.g., measured by a cost value) between a template (e.g., a template (512)) of a candidate reference block and a template (e.g., a current template) (511) of the current block (501), such as used in the IntraTMP mode. In an example, the template of the candidate reference block and the current template (511) have been coded, and the BV associated with a candidate reference block that provides the minimum cost may be used as the BV for performing the prediction of the current block (501). In the example shown in FIG. 5, the candidate reference block that provides the minimum cost may be the reference block (502), and the template of the candidate reference block (502) is the template (512).

In some examples, such as in the IBC mode, the block vector may be explicitly signaled in a bitstream such as in the IBC AMVP mode or implicitly signaled by an index of a candidate list such as in the IBC merge mode, where the most similar reference blocks may be sorted based on the similarities to the current block (501), or implicitly derived by selecting the best candidate from the candidate list.

Figure 6:
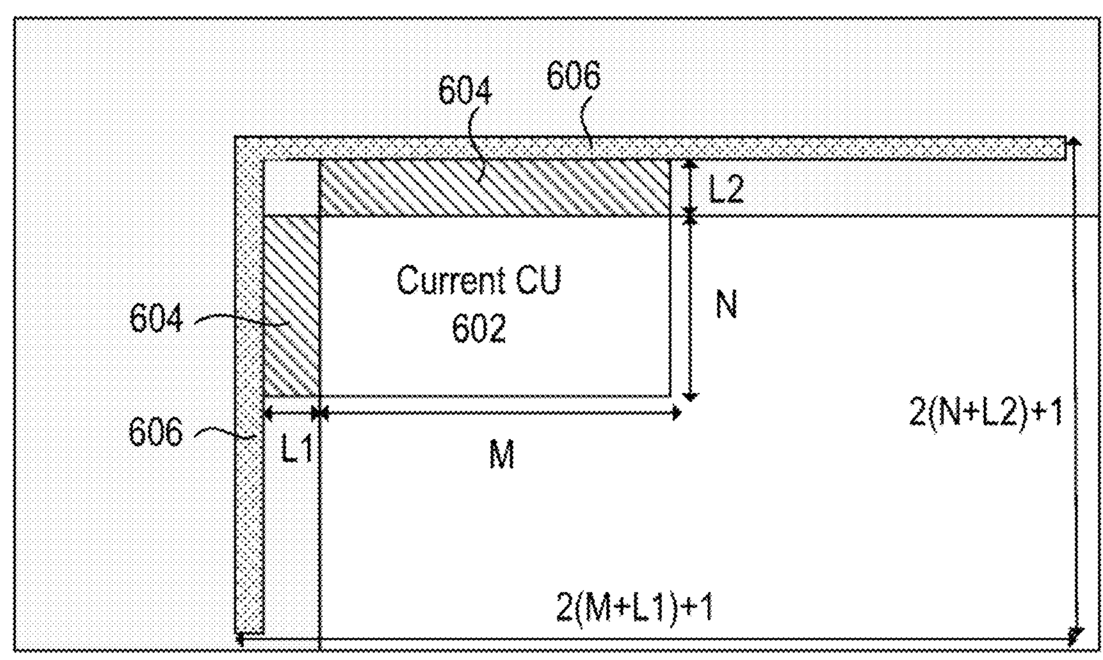
FIG. 6 shows an example of template-based intra mode derivation (TIMD).

The TIMD mode can use reference samples of a current CU as a template and select an intra mode among a set of candidate intra prediction modes that is associated with the TIMD. The selected intra mode may be determined as a best intra mode based on a cost function, for example. As shown in FIG. 6, neighboring reconstructed samples of the current CU (602) can be used as a template (604). Reconstructed samples in the template (604) can be compared with prediction samples of the template (604). The prediction samples can be generated using reference samples (606) of the template (604). The reference samples (606) can be neighboring reconstructed samples around the template (604). A cost function can be used to calculate a cost (or distortion) between the prediction samples and the reconstructed samples in the template (604) based on a respective one of the set of candidate intra prediction modes. An intra prediction mode with a minimum cost (or distortion) can be selected as the intra prediction mode (e.g., best intra prediction mode) to intra predict the current CU (602).

Figure 7:
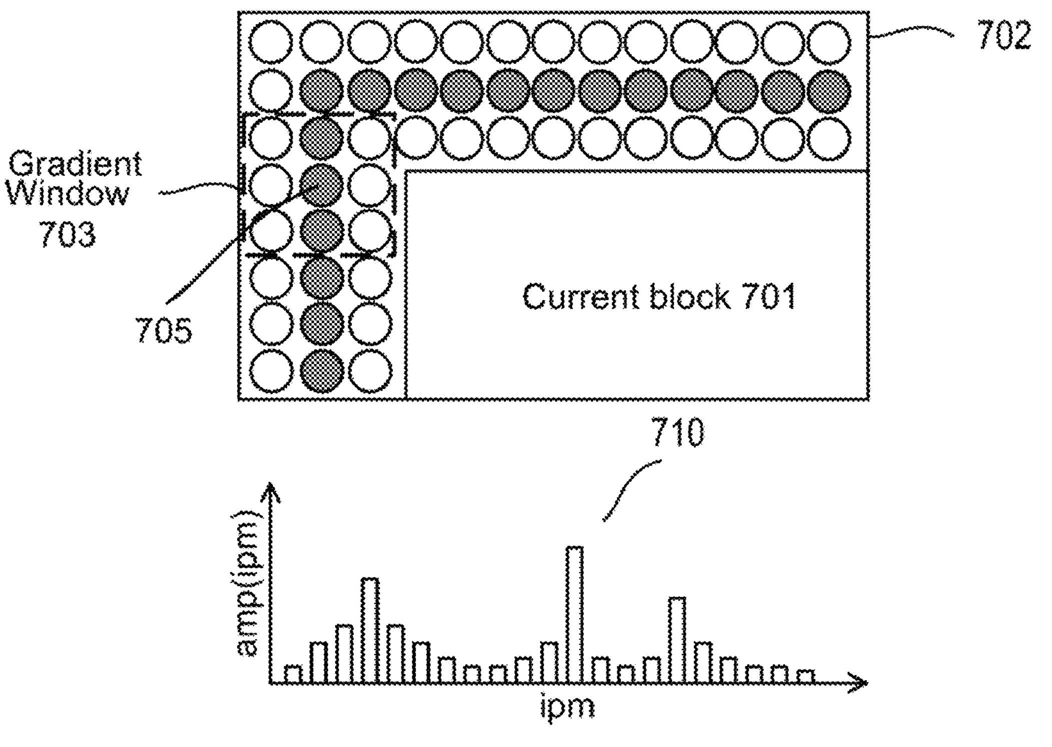
FIG. 7 shows an example of a decoder-side intra mode derivation (DIMD).

When the DIMD mode is applied, N intra modes can be derived from reconstructed neighbor samples in a template (702) around a current block (701), and the N predictors obtained using the N intra modes can be combined with the planar mode predictor with corresponding weights. The weights can be derived from gradients, such as a histogram of gradient (HoG) computation. FIG. 7 shows an example of the DIMD. The HoG computation can be carried out by applying filters (e.g., horizontal and vertical Sobel filters) on pixels in the template (702) around the current block (701). The template (702) can include reconstructed neighbor samples around the current block (701). In an example, the template has a width of 3. In an example, pixels (marked in gray) in the middle line of the template (702) can be involved in the HoG computation. Referring to FIG. 7, a window (703) around a pixel (705) can be used to determine a gradient associated with the pixel (705). The window (703) can have a size of 3×3 with the pixel (705) in the center of the window (703). A horizontal gradient and a vertical gradient can be obtained using, for example, horizontal and vertical Sobel filters, respectively. A direction or an orientation can be obtained from the horizontal gradient and the vertical gradient. An intra prediction mode (IPM) associated with the direction can be determined. Subsequently, a histogram of IPMs (also referred to as a HoG) (710) can be obtained. The IPMs corresponding to N tallest histogram bars can be selected for the current block (701).

When the method B is applied to the current block, in some examples, a top-right area of the current block may be used to predict the current block. The top-right area of the current block may be above the current block (501) and to the right of the current block (501). Referring to FIG. 5, the area (521) includes an area (550). The area (550) is already coded and is a top-right area of the current block (501) that is above the current block (501) and to the right of the current block (501). The area (550) includes top-right samples that are already coded and are above the current block (501) and to the right of the current block (501).

Referring to FIG. 5, in some examples, the search range in the IntraTMP mode or the IBC mode may include the top-right area (550). In some examples, the TIMD mode or the DIMD mode may also use a top-right area of the current block to predict the current block. Referring to FIG. 6, the reference samples (606) may include top-right samples of the current CU (602). In some examples (not shown in FIG. 6), the template (604) may include a top-right area of the current CU (602). In some examples (not shown in FIG. 7), the template (702) may include a top-right area of the current block (701).

In addition to the above examples, such as the IntraTMP mode, the IBC mode, the TIMD mode, and the DIMD mode, the method B may include other prediction methods that use top-right samples of a current block that are already coded and are above the current block and to the right of the current block to predict the current block. Referring back to FIG. 5, the method B may include other prediction methods that use the top-right samples in the area (550) of the current block (501).

Referring to FIG. 5, the pre-defined search region may include a top-right area of the current block (501), such as the top-right area (550). In this case, the parallelism allowed in the method A may be compromised in some examples. For example, when one of the CTUs to be processed in parallel overlaps with the area (550). Accordingly, the search area used in the method B may be restricted or constrained such that multiple blocks in respective CTUs may be processed in parallel using the method A and at least one of the multiple blocks is coded with the method B with the constrained search area.

The search area in the disclosure may refer to an area allowed for a reference block of the current block. A search operation may or may not be necessary to be performed. In an example, a search operation is performed. In an example, a search operation is not performed.

In an aspect, an initial search range or an initial search area may refer to a search range used in the method B, for example, without constraint imposed by parallel processing (e.g., using the method A). In an aspect, an allowed search range or an allowed search area may refer to a search range used in the method B, for example, with constraint imposed by parallel processing (e.g., using the method A). In an example, the initial search range includes the allowed search range and an area that is outside the allowed search range.

In an aspect, a search range in the method B, such as the initial search range in the method B, may be restricted (e.g., may be constrained), for example, in order to guarantee a possibility of the parallel processing in the method A. When the initial search range in the method B is constrained to obtain the allowed search range, the method A and the method B may be applied together to code the current picture.

Figure 8:
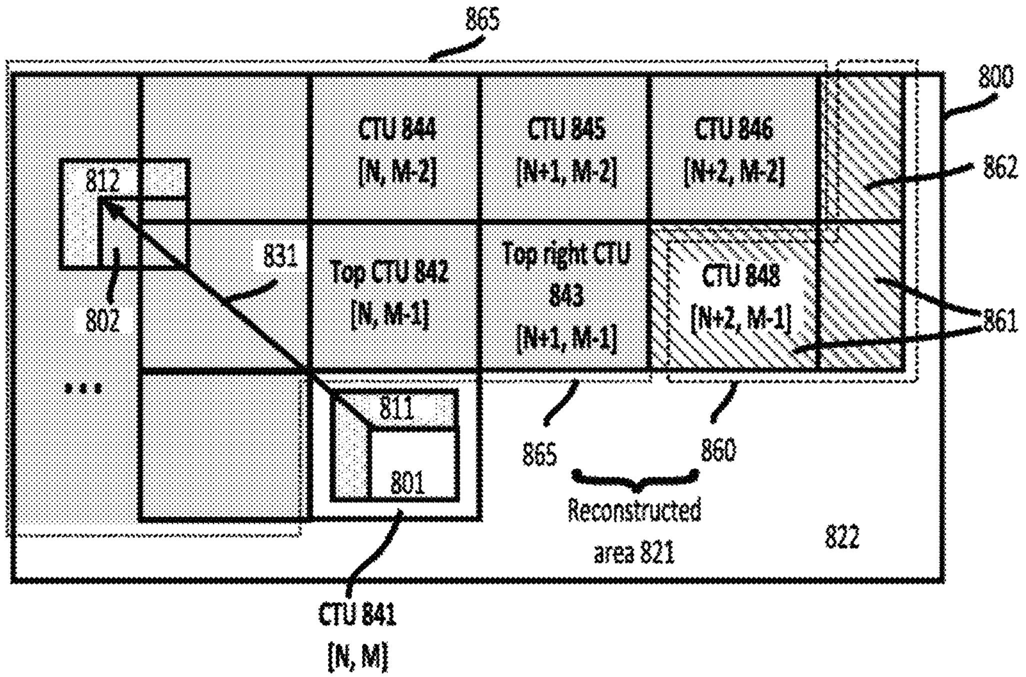
FIGS. 8-12 show examples of respective allowed search range of a current block in a current picture according to an aspect of the disclosure.

According to an aspect of the disclosure, referring to FIG. 8, a current block (801) in a first CTU (or a current CTU) (841) with a CTU coordinate [N, M] may be predicted using samples in a current picture (800), for example, using the method B as described in FIG. 5. A reference block (802) indicated by a BV (831) may be determined using the method B, for example, based on a template (811) of the current block (801) and reference templates including a reference template (812) of the reference block (802).

The CTU coordinate [N, M] indicates that the first CTU (841) is located at a CTU row M and a CTU column N. The first CTU (841) and a second CTU (848) that are in two adjacent rows (e.g., CTU rows M and (M−1)) of the current picture (800) may be processed in parallel, for example, using the method A such as the WPP. In an example, the method B may include the IntraTMP mode or the IBC mode, and the reference block (802) of the current block (801) may be determined in an allowed search range (865) that is constrained for parallel processing of the first CTU (841) and the second CTU (848) in the current picture (800). The current block (801) may be coded (e.g., encoded or reconstructed) using the reference block (802) of the current block (801).

In an example, the method B may include the IntraTMP mode or the IBC mode, and the allowed search range (865) is constrained based on the first CTU (841) and the second CTU (848) being separated by at least one CTU column, such as the CTU column (N+1).

In an example, a CTU at one of the top-most row and the right-most column in the current picture (800) is indicated by a CTU [N+L, M−L] that is separated from the first CTU (841) by L CTU columns and L CTU rows. When L is larger than 0, for a CTU row [M−i], the allowed search range (865) of the current block (801) in the first CTU (841) is constrained to one or more CTUs that are to the left of a CTU at [N+i+1, M−i] where is i is from 1 to L. In an example, the allowed search range (865) does not include each CTU that is (i) in the CTU row [M−i] and (ii) to the right of the CTU at [N+i, M−i] where i is from 1 to L. For example, when i is 1, for a CTU row [M−1], the allowed search range (865) is constrained to one or more CTUs that are to the left of the CTU (848) at [N+2, M−1], and thus for the CTU row [M−1], the allowed search range (865) includes a CTU (842) and the CTU (843) and does not include the CTU (848).

In an example, the search region (e.g., the allowed search range (865)) in the method B is constrained (e.g., is restricted) to be at most one CTU to the top-right of the current CTU (841) per CTU row, as shown in FIG. 8. For the direct CTU row above (e.g., the CTU row (M−1) in FIG. 8), an area (861) beyond a top-right CTU (843) with a CTU coordinate [N+1, M−1] may be excluded from the allowed search region (865). For a CTU row (M−2), an area (862) beyond a CTU (846) with a CTU coordinate [N+2, M−2] may be excluded from the allowed search region (865) until a top CTU row in the current picture (800). For the CTU row (M−2), the allowed search range (865) includes CTUs (844)-(846).

Referring to FIG. 8, the picture (800) includes a processed area (821) and an area (822) that is to be processed (or coded). In an example, the processed area (821) is an initial search range for the method B with constraint from parallel processing using the method A. The initial search range (821) may include the allowed search range (865) and an area (860) that is outside the allowed search range (865). The area (860) is excluded from the allowed search range (865). The area (860) may include the areas (861)-(862).

Figure 9:
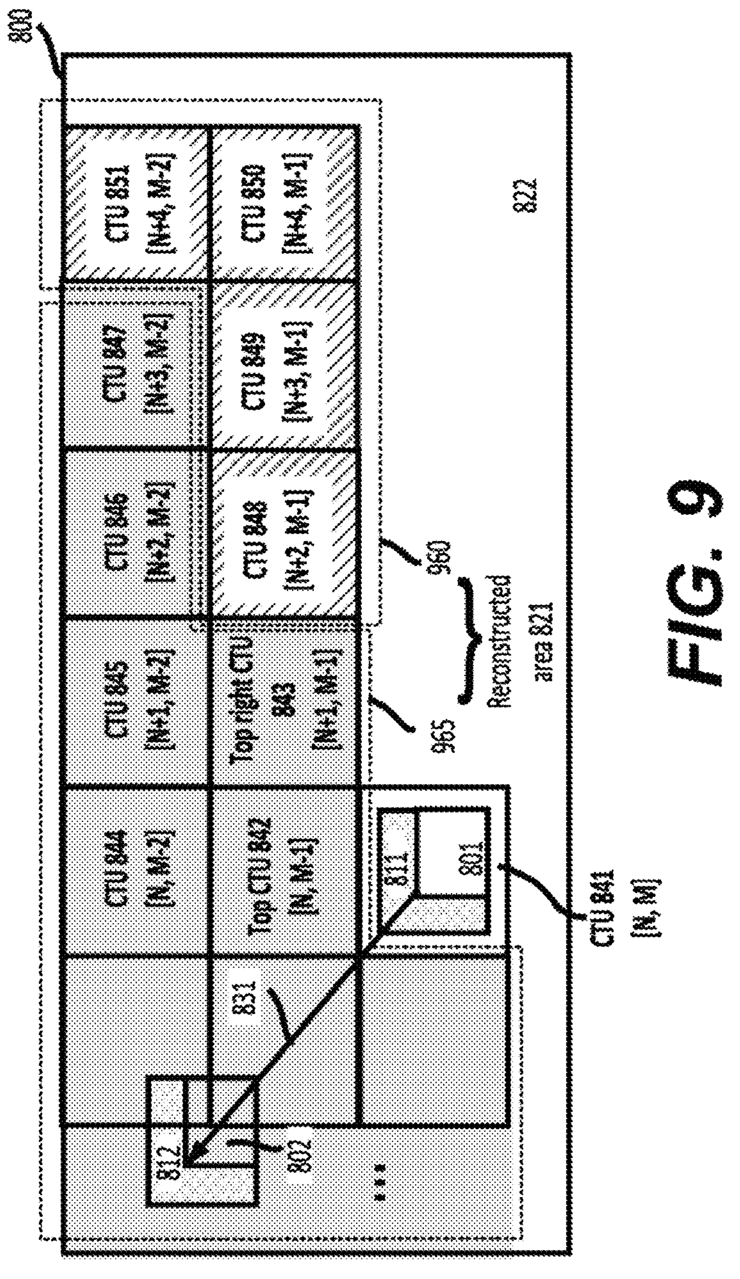

FIG. 9 shows an example of an allowed search range (965) according to an aspect of the disclosure. The picture (800) includes the processed area (821) and the area (822) that is to be processed (or coded) as described in FIG. 8. In an example, the processed area (821) is the initial search range for the method B. The initial search range (821) may include the allowed search range (965) and an area (960) that is outside the allowed search range (965). The area (960) is excluded from the allowed search range (965). In an example, a CTU at one of the top-most row and the right-most column in the current picture (800) is indicated by [N+2L, M−L], an the CTU at [N+2L, M−L] is separated from the first CTU (841) by 2L CTU columns and L CTU rows. Referring to FIG. 9, when L is larger than 0, for a CTU row [M−i], the allowed search range (965) of the current block (801) in the first CTU (841) may be constrained to one or more CTUs that are to the left of a CTU at [N+2i, M−i] where i is from 1 to L, for example, the allowed search range (965) does not include each CTU that is in the CTU row [M−i] and to the right of a CTU at [N+2i−1, M−i]. When i is 1, for the CTU row [M−1], the allowed search range (965) is constrained to one or more CTUs that are to the left of the CTU at [N+2, M−1], and thus includes the CTUs (842)-(843) and does not include CTUs (848)-(850). When i is 2, for the CTU row [M−2], the allowed search range (965) is constrained to one or more CTUs that are to the left of the CTU (851) at [N+4, M−2], and thus includes the CTUs (844)-(847) and does not include the CTU (851).

Figure 10:
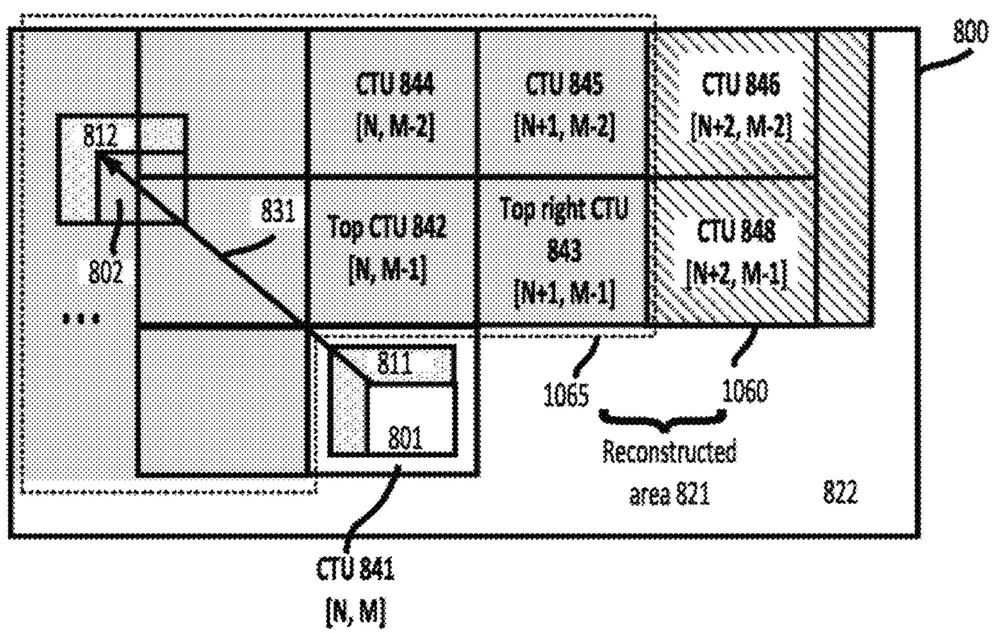

FIG. 10 shows an example of an allowed search range (1065) according to an aspect of the disclosure. The picture (800) includes the processed area (821) and the area (822) that is to be processed (or coded) as described in FIG. 8. In an example, the processed area (821) is the initial search range for the method B. The initial search range (821) may include the allowed search range (1065) and an area (1060) that is outside the allowed search range (1065). The area (1060) is excluded from the allowed search range (1065).

In an aspect, the search region in the method B such as the allowed search range (1065) in FIG. 10 is restricted to be at most one CTU (e.g., one CTU column) to the right of the current CTU (841). The area (1060) that is beyond the right CTU column [N+1] is excluded from the search region such as the allowed search range (1065). For example, the allowed search range (1065) of the current block (801) in the first CTU (841) is constrained to one or more CTUs that are to the left of a CTU column [N+2] when the one or more CTUs are located above the CTU row M. Referring to FIG. 10, the CTU column [N+2] includes the CTUs (846) and (848). In an example, the allowed search range (1065) does not include each CTU that is to the right of the CTU column [N+1]. Referring to FIG. 10, the CTU column [N+1] includes the CTUs (843) and (845).

Figure 11:
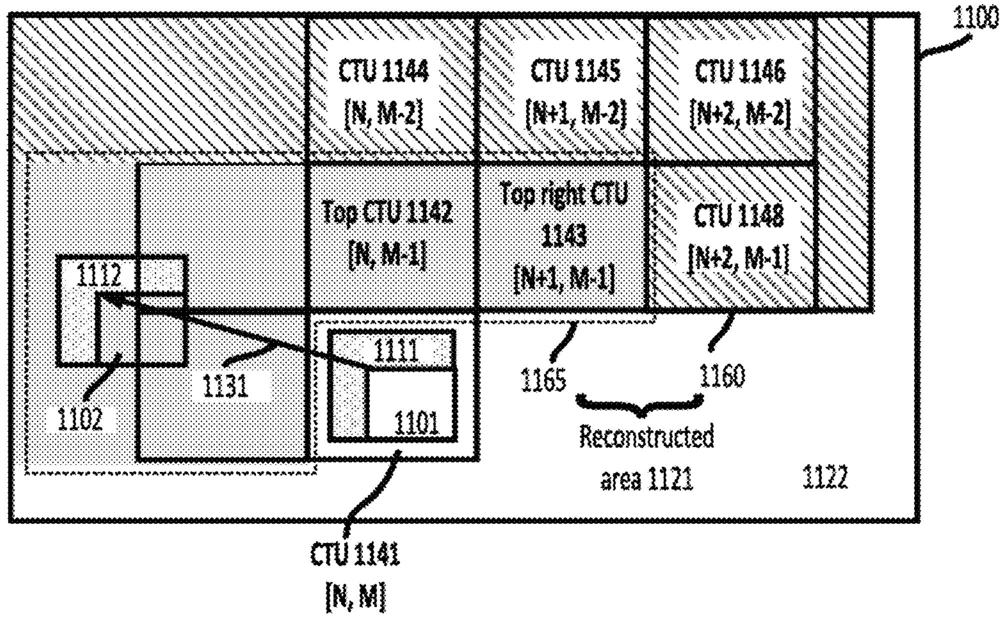

FIG. 11 shows an example of an allowed search range (1165) according to an aspect of the disclosure. A current block (1101) in a first CTU (1141) with a CTU coordinate [N, M] may be predicted using samples in a current picture (1100), for example, using the method B. A reference block (1102) indicated by a BV (1131) may be determined using the method B, for example, based on a template (1111) and reference templates including a reference template (1112) of the reference block (1102). The CTU coordinate [N, M] indicates that the first CTU (1141) is located at a CTU row M and a CTU column N. The first CTU (1141) and a second CTU (1148) that are in two adjacent rows (e.g., CTU rows M and (M−1)) of the current picture (1100) may be processed in parallel, for example, using the method A such as the WPP. In an example, the method B may include the IntraTMP mode or the IBC mode, and a reference block (1102) of the current block (1101) may be determined in an allowed search range (1165) that is constrained for parallel processing of the first CTU (1141) and the second CTU (1148) in the current picture (1100). The current block (1101) may be coded (e.g., encoded or reconstructed) using the reference block (1102).

The picture (1100) includes a processed area (1121) and an area (1122) that is to be processed (or coded). In an example, the processed area (1121) is the initial search range for the method B, for example, without constraint for parallel processing using the method A. The initial search range (1121) may include the allowed search range (1165) and an area (1160) that is outside the allowed search range (1165). The area (1160) is excluded from the allowed search range (1165). Referring to FIG. 11, the allowed search range (1165) may be constrained to one or more CTUs that are below a CTU row [M−2] and to the left of a CTU column [N+2]. For example, the CTU row [M−2] includes CTUs (1144)-(1146), and the CTU column [N+2] includes the CTUs (1146) and (1148). For example, the allowed search range (1165) does not include each CTU that is above a CTU row [M−1] or to the right of a CTU column [N+1].

In an aspect, the allowed search range (e.g., (865)) of the current block (e.g., (801)) in the first CTU (e.g., (841)) may be constrained based on a block width (e.g., indicated by block_width) and/or a block height (e.g., indicated by block_height) of the current block (e.g., (801)). The search area (e.g., the allowed search range (865)) in the method B may be determined based on the block width (e.g., the CU width) and/or the block height (e.g., the CU height). In an example, samples allowed to be searched to the right most is (x+5×block_width), where x is a horizonal coordinate of the current block. In an example, a CTU size is 128×128. In an example, a CU size or a block size may vary from 8×8 to 64×64. In an example, the samples allowed to be searched to the top most is (y−5×block_height), where y is a vertical coordinate of the current block.

Figure 12:
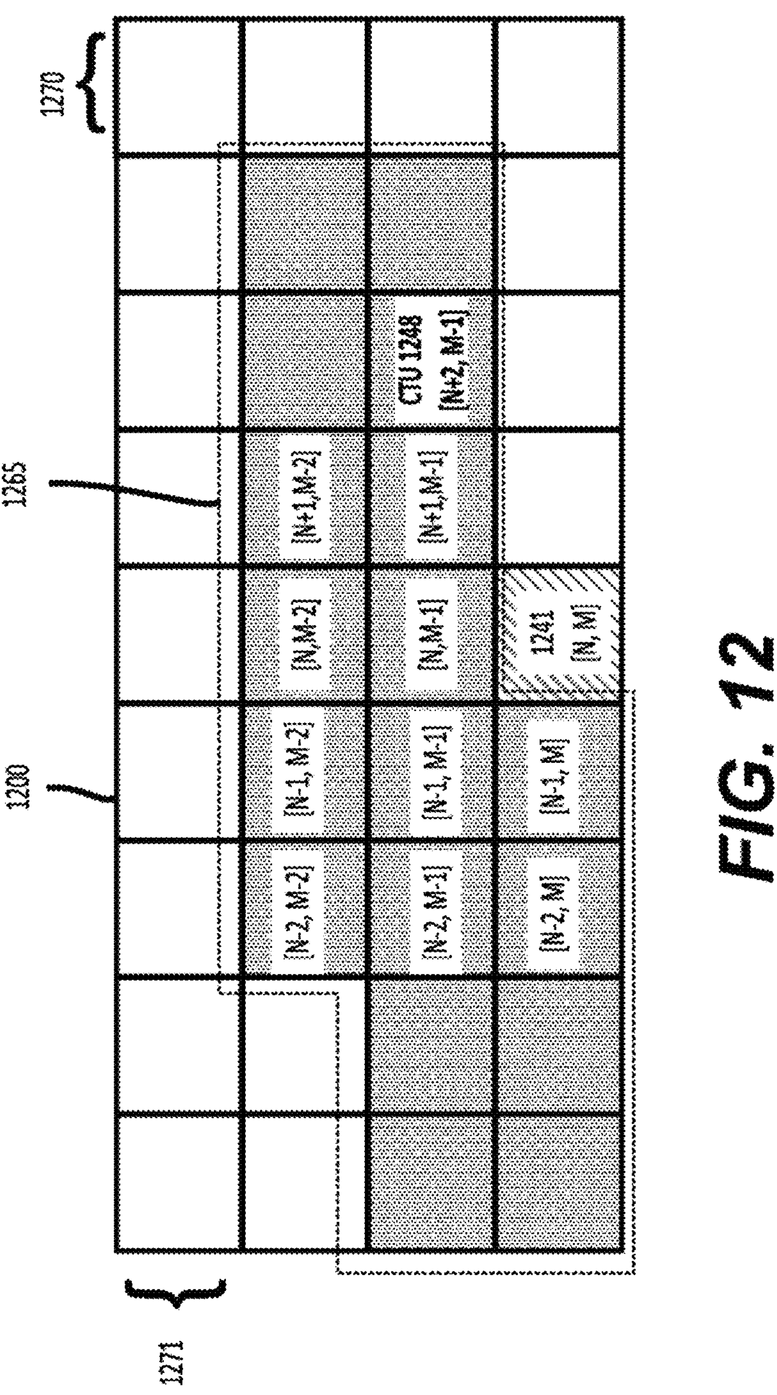

In an aspect, the search area such as an allowed search range in the method B may be determined based on the CTU size. FIG. 12 shows an example of an allowed search range (1265) such as a CTU-based search area in the method B according to an aspect of the disclosure. A picture (1200) includes a first CTU (1241) that is being coded. The first CTU (1241) in the current picture (1200) is indicated by a CTU coordinate [N, M], a CTU row is indicated by M, and a CTU column is indicated by N. In an example, multiple CTUs such as the first CTU (1241) and a CTU (1248) are being processed in parallel using the method A such as described in the disclosure. In an example, the allowed search range (1265) of a current block in the first CTU (1241) may be constrained to one or more CTUs that are the left of a CTU column [N+4] (e.g., the CTU column (1270) in FIG. 12) and below a CTU row [M−3] (e.g., the CTU row (1271) in FIG. 12). The current block in the first CTU (1241) may be coded using the method B. In an example, the CTU size for the CTUs in FIG. 12 may be less than 256×256, such as 128×128.

In an example, when the CTU size is 256 (e.g., 256×256), the search area (e.g., the allowed search range) includes one CTU row above the CTU row M instead of two CTU rows above as shown in FIG. 12. For example, when the CTU size is 256, the allowed search range for the current block in the current CTU (1241) includes CTUs in the CTU row (M−1) and does not include CTUs in the CTU row (M−2).

Figure 13:
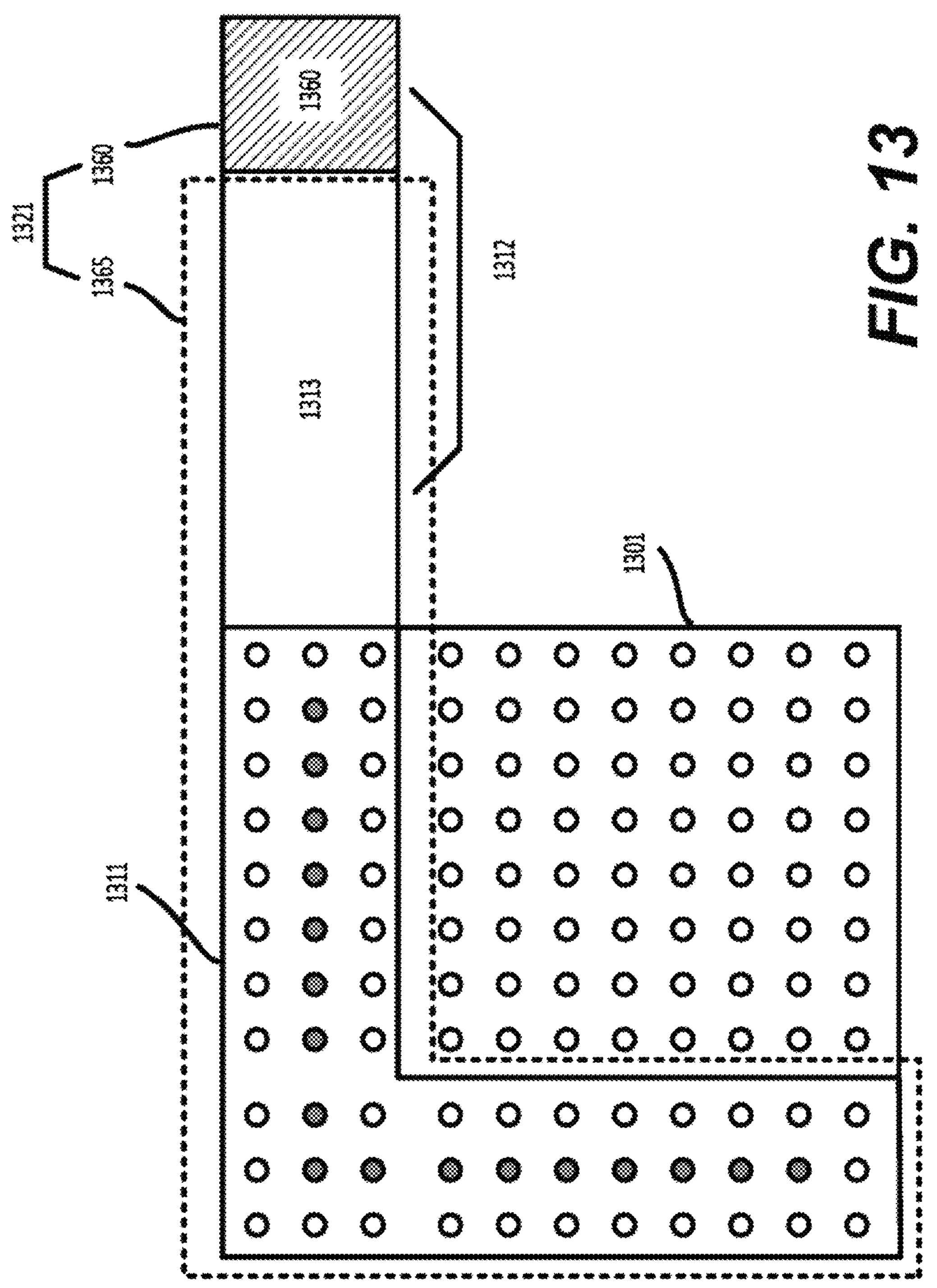
FIG. 13 shows an example of constraint to a template of a current block according to an aspect of the disclosure.

In an aspect, an intra prediction process from the method B, such as the DIMD mode or the TIMD mode, may depend on availability of samples on the top-right of a current block as shown in FIG. 13. FIG. 13 shows an example of constraint to a template (1365) of a current block (1301) according to an aspect of the disclosure. In an example, the method B may include the TIMD or the DIMD. The current block (1301) may be predicted using one of the DIMD mode and the TIMD mode. In an example, the intra prediction mode of the current block (1301) may be determined based on the template (1365) that is adjacent to the current block (1301) using the one of the DIMD mode and the TIMD mode. The current block (1301) may be coded (e.g., encoded or decoded) using the intra prediction mode of the current block (1301). In an example, the current block (1301) is in a first CTU such as the CTU (402) in the picture (400) in FIG. 4. According to an aspect of the disclosure, the template (1365) that is adjacent to the current block (1301) may be constrained such that the first CTU (402) and a second CTU (e.g., the CTU (403) in the picture (400) in FIG. 4) may be processed in parallel using the method A. In an example, the samples in the template (1365) may be used to determine a similar prediction signal or may be used as reference samples to generate a prediction signal using interpolation filter(s).

In an aspect, usage of top right dependent samples (e.g., samples in a portion (1312) in FIG. 13) may be modified (e.g., may be constrained) in a way such that no samples from a restricted area (e.g., a restricted area in an initial template of the current block (1301) are used according to examples described in the method B in order not to compromise the parallelism in the method A. Referring to FIG. 13, an initial template (1321) may be adjacent to the current block (1301). The initial template (1321) may have any suitable shape and may include any suitable number of samples. In the example shown in FIG. 13, the initial template (1321) has an L shape such as shown in FIG. 13. In an example, the initial template may include only a top template that is above the current block. In an example, the initial template (1321) may be available to the one of the TIMD and the DIMD, for example, the initial template (1321) may be used in the one of the TIMD and the DIMD to determine the intra prediction mode of the current block (1301) when no constraint is imposed on the initial template (1321).

Referring to FIG. 13, the initial template (1321) may include a portion (1311) and a portion (1312) that is to the right of the portion (1311). In an example, the portion (1311) has an L shape and is adjacent to the current block (1301). The portion (1312) is to the top-right of the current block (1301). In an example, the initial template (1321) includes an initial top template that is above the current block (1301). The initial top template may include the portion (1312) that is to the top-right of the current block (1301) and samples that are directly above the current block (1301). The samples that are directly above the current block (1301) are included in the portion (1311).

In an example, a template (1365) that is adjacent to the current block (1301) is constrained to samples that are to the left of a right-most portion (1360) of the initial top template. The initial template (1321) may include the template (1365) and the right-most portion (1360) of the initial top template. In an example, the initial template (1321) consists of the template (1365) and the right-most portion (1360) of the initial top template that is above the current block (1301). Referring to the FIG. 13, the portion (1312) includes a portion (1313) and the portion (1360). The portion (1313) may be located between the portion (1311) and the portion (1360).

As shown in FIG. 13, when a template is used in the method B (e.g., the TIMD or the DIMD) to determine the intra prediction mode of the current block (1301), the initial template (1321) is modified by removing or not using the samples in the portion (1360) to determine the template (1365). The template (1365) may be used in the method B and the first CTU including the current block (1301) may be processed in parallel with another CTU in the same picture using the method A.

In an aspect, referring to FIG. 8, when a reference block in the picture (800) is partially located inside the allowed search region (865) and is partially located outside the allowed search region (865), for example, the reference block is partially located in the area (860), a sample padding process may be applied to pad the samples located in the area (860) (e.g., a search region that is not allowed for parallel processing). The reference block may be used to predict the current block (801). In an example, referring to FIG. 8, the sample padding process is performed using the nearest sample value within the allowed search region (865).

In an aspect, referring to FIG. 13, when samples to be used to determine the intra prediction mode of the current block (1301) include first samples located inside the template (1365) and second samples located outside the template (1365), for example, the second samples are located in the portion (1360), a sample padding process may be applied to pad the samples located in the portion (1360) that are not allowed for parallel processing. In an example, referring to FIG. 13, the sample padding process is performed using the nearest sample value within the template (1365).

In an example, the sample padding process is performed using a default value such as $2^{(bitdepth-1)}$, where a parameter bitdepth indicates a bit depth that the codec operates.

In an aspect, a variation of the method A may be used, such as tolerant different CTU coding latency between two CTU rows such as two adjacent CTU rows. For example, referring back to FIG. 9, the CTU coding latency between two CTU rows M and M−1 may be two CTUs, and thus when a top CTU (e.g., (842)) of the current CTU (e.g., (841)) and a top-right CTU (e.g., (843)) of the current CTU are processed in the above row (e.g., the CTU row (M−1)), the current CTU may be processed (e.g., the encoder may start encoding or the decoder may start decoding). In this case, the restriction of the search region described in the disclosure may be adaptively applied in order not to compromise the parallel processing. In an example, the allowed search range of the current block (801) in the first CTU (841) may be constrained based on the CTU coding latency between two CTU rows, such as a number of at least one CTU column between the first CTU (841) and the second CTU (848).

In an example, referring to FIGS. 4 and 13, the template (1365) that is adjacent to the current block (1301) may be constrained based on a number of at least one CTU column between the first CTU (402) and the second CTU (403).

In an aspect, the method A and/or the method B may be signaled in a high-level syntax structure to specify whether the method A and/or the method B are enabled or not. The high-level syntax structure may include, but is not limited to, a sequence header, a picture header, a subpicture header, a slice header, a tile header, or the like. In an example, coded information in a bitstream may include a high-level syntax element in the high-level syntax structure indicating the current block is to be reconstructed using the allowed search range of the current block in the first CTU or the template that is adjacent to the current block, and a high-level associated with the high-level syntax element is higher than a CTU level, such as the high-level corresponding to a sequence header, a picture header, a subpicture header, a slice header, a tile header, or the like.

Figure 14:
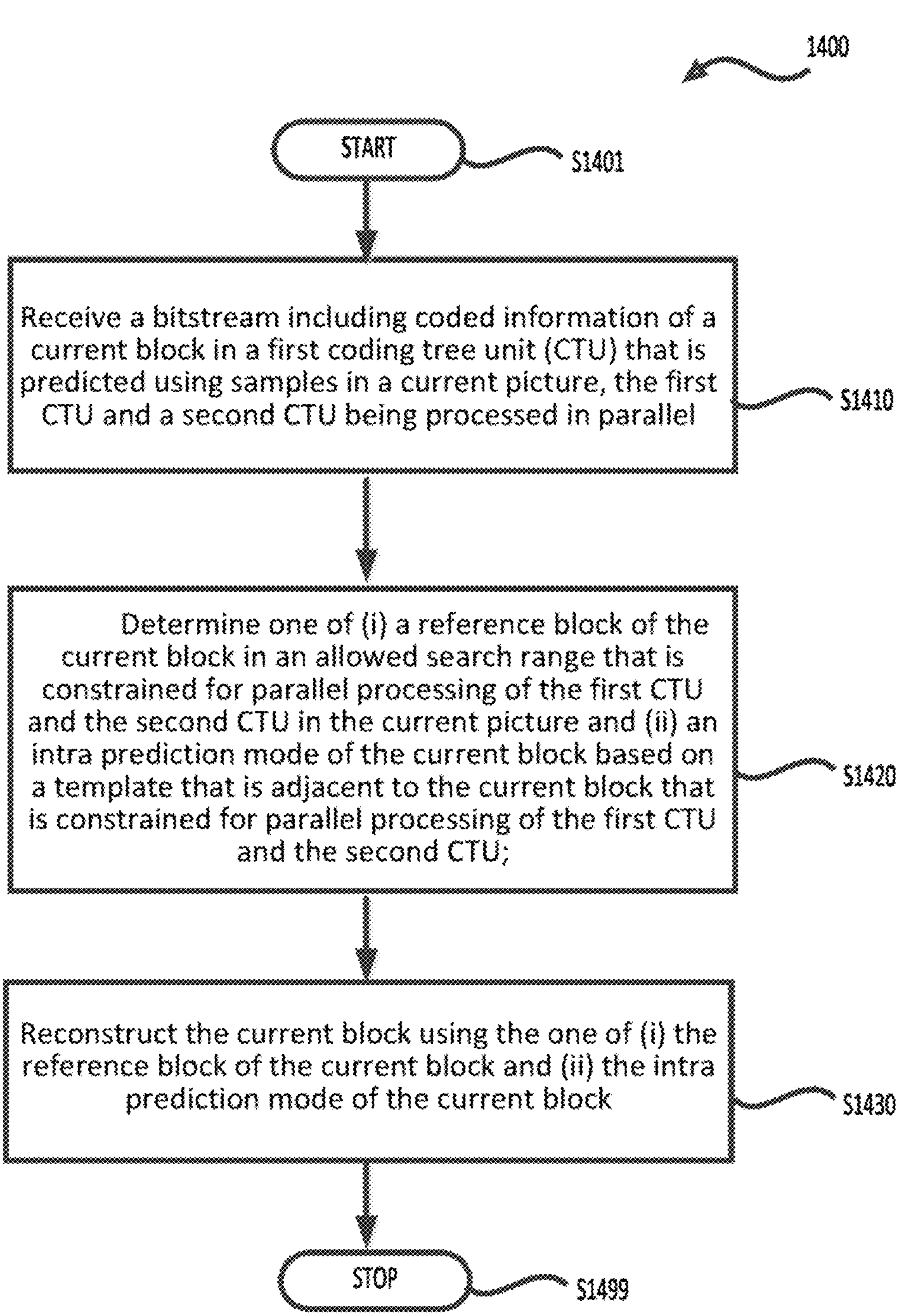
FIG. 14 shows a flow chart outlining a decoding process according to some aspects of the disclosure.

FIG. 14 shows a flow chart outlining a process (1400) according to an aspect of the disclosure. The process (1400) can be used in an apparatus, such as a video decoder. In various aspects, the process (1400) is executed by processing circuitry, such as the processing circuitry that performs functions of the video decoder (110), the processing circuitry that performs functions of the video decoder (210), and the like. In some aspects, the process (1400) is implemented in software instructions, thus when the processing circuitry executes the software instructions, the processing circuitry performs the process (1400). The process starts at (S1401) and proceeds to (S1410).

At (S1410), a bitstream including coded information of a current block in a first coding tree unit (CTU) is received. The current block is predicted using samples in a current picture, for example, using the method A such as intra prediction. The first CTU and a second CTU may be processed in parallel such as using the method A.

At (S1420), the process (1400) may include determining one of (i) a reference block of the current block in an allowed search range that is constrained for parallel processing of the first CTU and the second CTU in the current picture and (ii) an intra prediction mode of the current block based on a template that is adjacent to the current block that is constrained for parallel processing of the first CTU and the second CTU.

At (S1430), the current block may be reconstructed using the one of (i) the reference block of the current block and (ii) the intra prediction mode of the current block.

Then, the process proceeds to (S1499) and terminates.

The process (1400) can be suitably adapted. Step(s) in the process (1400) can be modified and/or omitted. Additional step(s) can be added. Any suitable order of implementation can be used.

In an aspect, the one of (i) the reference block of the current block and (ii) the intra prediction mode of the current block is the reference block in the allowed search range in the current picture. The reference block may be determined using one of an intra template matching prediction (IntraTMP) mode and an intra block copy (IBC) mode. The current block may be reconstructed using the reference block of the current block. The allowed search range of the current block in the first CTU may be constrained based on the first CTU and the second CTU being in two adjacent rows of the current picture and being separated by one CTU column.

In an example, the first CTU in the current picture is indicated by a CTU coordinate [N, M], a CTU row is indicated by M, and a CTU column is indicated by N. A CTU at one of the top-most row and the right-most column in the current picture is indicated by [N+L, M−L], and the CTU at [N+L, M−L] is separated from the first CTU by L CTU columns and L CTU rows. When L is larger than 0, for a CTU row [M−i], the allowed search range of the current block in the first CTU is constrained to one or more CTUs that are to the left of a CTU at [N+i+1, M−i] where i is from 1 to L.

In an example, the first CTU in the current picture is indicated by a CTU coordinate [N, M], and a CTU row is indicated by M, and a CTU column is indicated by N. A CTU at one of the top-most row and the right-most column in the current picture is indicated by [N+2L, M−L], and the CTU at [N+2L, M-L] is separated from the first CTU by 2L CTU columns and L CTU rows. When L is larger than 0, for a CTU row [M−i], the allowed search range of the current block in the first CTU is constrained to one or more CTUs that are to the left of a CTU at [N+2i, M−i] where i is from 1 to L.

In an example, the first CTU in the current picture is indicated by a CTU coordinate [N, M], and a CTU row is indicated by M, and a CTU column is indicated by N. The allowed search range of the current block in the first CTU is constrained to one or more CTUs that are to the left of a CTU column [N+2] when the one or more CTUs are located above the CTU row M.

In an example, the first CTU in the current picture is indicated by a CTU coordinate [N, M], and a CTU row is indicated by M, and a CTU column is indicated by N. The allowed search range of the current block in the first CTU is constrained to one or more CTUs that are below a CTU row [M−2] and to the left of a CTU column [N+2].

In an example, the allowed search range of the current block in the first CTU is constrained based on one of a block width and a block height of the current block.

In an example, the first CTU in the current picture is indicated by a CTU coordinate [N, M], a CTU row is indicated by M, and a CTU column is indicated by N, and the allowed search range of the current block in the first CTU is constrained to one or more CTUs that are the left of a CTU column [N+4] and below a CTU row [M−3].

In an example, the one of (i) the reference block of the current block and (ii) the intra prediction mode of the current block is the intra prediction mode of the current block determined based on the template that is adjacent to the current block using one of template-based intra prediction mode derivation (TIMD) and decoder-side intra mode derivation (DIMD). The current block is reconstructed using the intra prediction mode of the current block. The template that is adjacent to the current block is constrained based on a number of at least one CTU column between the first CTU and the second CTU that are in two adjacent rows of the current picture.

In an example, an initial template available to the one of the TIMD and the DIMD includes an initial top template. The template that is adjacent to the current block is constrained to samples to the left of a right-most portion of the initial top template. The initial template consists of the template and the right-most portion of the initial top template.

In an example, the allowed search range of the current block in the first CTU or the template that is adjacent to the current block is constrained based on a number of at least one CTU column between the first CTU and the second CTU that are in two adjacent rows of the current picture.

In an example, the coded information includes a high-level syntax element indicating the current block is to be reconstructed using the allowed search range of the current block in the first CTU or the template that is adjacent to the current block, and a high-level associated with the high-level syntax element is higher than a CTU level.

Figure 15:
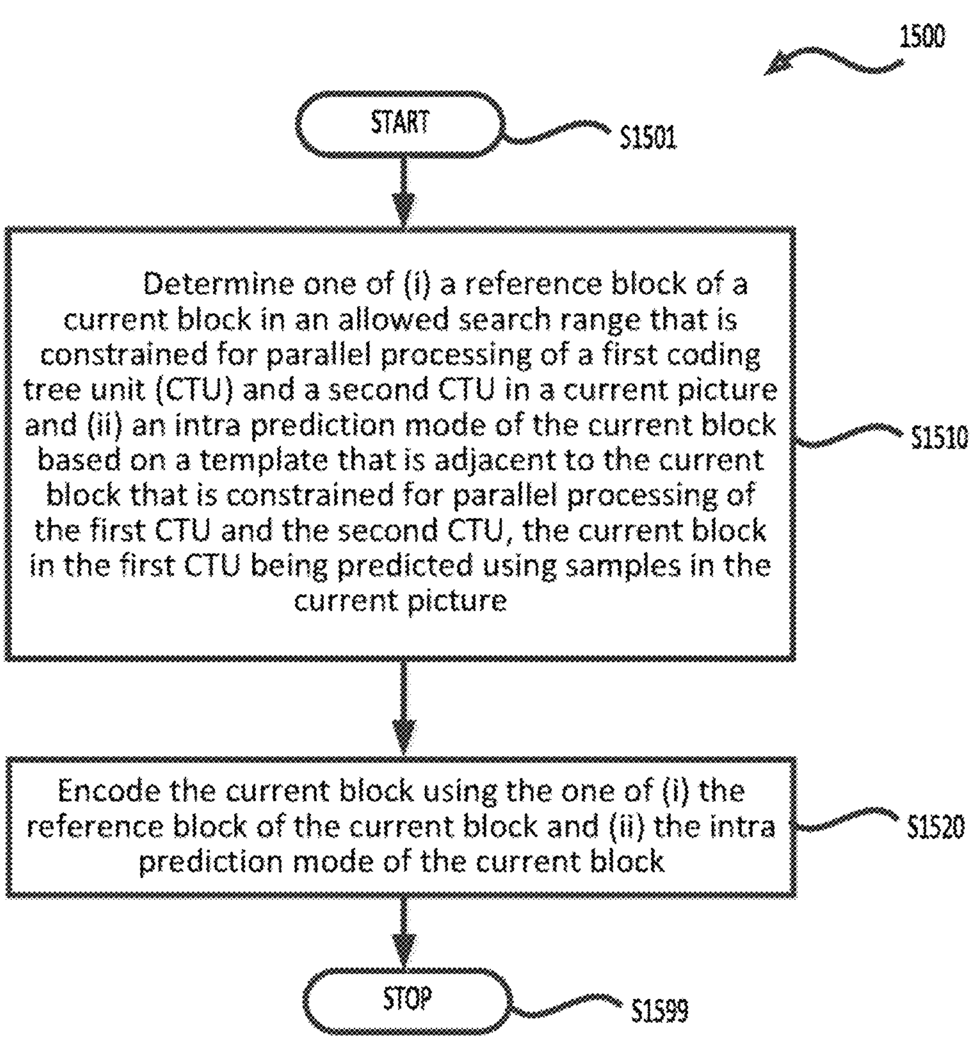
FIG. 15 shows a flow chart outlining an encoding process according to some aspects of the disclosure.

FIG. 15 shows a flow chart outlining a process (1500) according to an aspect of the disclosure. The process (1500) can be used in a video encoder. In various aspects, the process (1500) is executed by processing circuitry, such as the processing circuitry that performs functions of the video encoder (103), the processing circuitry that performs functions of the video encoder (303), and the like. In some aspects, the process (1500) is implemented in software instructions, thus when the processing circuitry executes the software instructions, the processing circuitry performs the process (1500). The process starts at (S1501) and proceeds to (S1510).

At (S1510), the process (1500) includes determining one of (i) a reference block of a current block in an allowed search range that is constrained for parallel processing of a first coding tree unit (CTU) and a second CTU in a current picture and (ii) an intra prediction mode of the current block based on a template that is adjacent to the current block that is constrained for parallel processing of the first CTU and the second CTU. The current block in the first CTU may be predicted using samples in the current picture.

At (S1520), the current block may be encoded using the one of (i) the reference block of the current block and (ii) the intra prediction mode of the current block.

Then, the process proceeds to (S1599) and terminates.

The process (1500) can be suitably adapted. Step(s) in the process (1500) can be modified and/or omitted. Additional step(s) can be added. Any suitable order of implementation can be used.

In an example, the one of (i) the reference block of the current block and (ii) the intra prediction mode of the current block is the reference block of the current block in the allowed search range in the current picture. The reference block is determined using one of an intra template matching prediction (IntraTMP) mode and an intra block copy (IBC) mode. The current block is encoded using the reference block of the current block. The allowed search range of the current block in the first CTU is constrained based on the first CTU and the second CTU being in two adjacent rows of the current picture and being separated by one CTU column.

In an example, the first CTU in the current picture is indicated by a CTU coordinate [N, M], a CTU row is indicated by M, and a CTU column is indicated by N, a CTU at one of the top-most row and the right-most column in the current picture is indicated by [N+L, M−L], and the CTU [N+L, M−L] is separated from the first CTU by L CTU columns and L CTU rows. When L is larger than 0, for a CTU row [M−i], the allowed search range of the current block in the first CTU is constrained to one or more CTUs that are to the left of a CTU at [N+i+1, M−i] where i is from 1 to L.

In an example, the first CTU in the current picture is indicated by a CTU coordinate [N, M], a CTU row is indicated by M, and a CTU column is indicated by N, a CTU at one of the top-most row and the right-most column in the current picture is indicated by [N+2L, M−L], and the CTU [N+2L, M−L] is separated from the first CTU by 2L CTU columns and L CTU rows. When L is larger than 0, for a CTU row [M−i], the allowed search range of the current block in the first CTU is constrained to one or more CTUs that are to the left of a CTU at [N+2i, M−i] where i is from 1 to L.

In an example, the first CTU in the current picture is indicated by a CTU coordinate [N, M], a CTU row is indicated by M, and a CTU column is indicated by N, and the allowed search range of the current block in the first CTU is constrained to one or more CTUs that are to the left of a CTU column [N+2] when the one or more CTUs are located above the CTU row M.

In an example, the first CTU in the current picture is indicated by a CTU coordinate [N, M], a CTU row is indicated by M, and a CTU column is indicated by N, and the allowed search range of the current block in the first CTU is constrained to one or more CTUs that are below a CTU row [M−2] and to the left of a CTU column [N+2].

In an example, the one of (i) the reference block of the current block and (ii) the intra prediction mode of the current block is the intra prediction mode of the current block determined based on the template that is adjacent to the current block using one of template-based intra prediction mode derivation (TIMD) and decoder-side intra mode derivation (DIMD). The current block is encoded using the intra prediction mode of the current block. An initial template available to the one of the TIMD and the DIMD includes an initial top template. The template that is adjacent to the current block is constrained to samples to the left of a right-most portion of the initial top template. The initial template consists of the template and the right-most portion of the initial top template.

Although the decoding and encoding processes are provided in separate flow charts for the purpose of description, it is noted that aspects of the decoding and encoding processes may be used in combination. For example, a decoding process such as described in the process (1400) may incorporate all or a portion of the process (1500). In another example, an encoding process such as described in the process (1500) may be combined with the process (1400).

In an aspect, a method of processing visual media data is disclosed. The method includes processing a bitstream of the visual media data according to a format rule. The bitstream includes a syntax element indicating that a current block in a first coding tree unit (CTU) is predicted using samples in a current picture. The first CTU and a second CTU are processed in parallel. The format rule specifies that: determining one of (i) a reference block of the current block in an allowed search range that is constrained for parallel processing of the first CTU and the second CTU in the current picture and (ii) an intra prediction mode of the current block based on a template that is adjacent to the current block that is constrained for parallel processing of the first CTU and the second CTU is performed, and the current block is reconstructed using the one of (i) the reference block of the current block and (ii) the intra prediction mode of the current block.

Aspects and/or examples in the disclosure may be used separately or combined in any order. For example, some aspects and/or examples performed by the decoder may be performed by the encoder and vice versa. Each of the methods, aspects, examples, an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
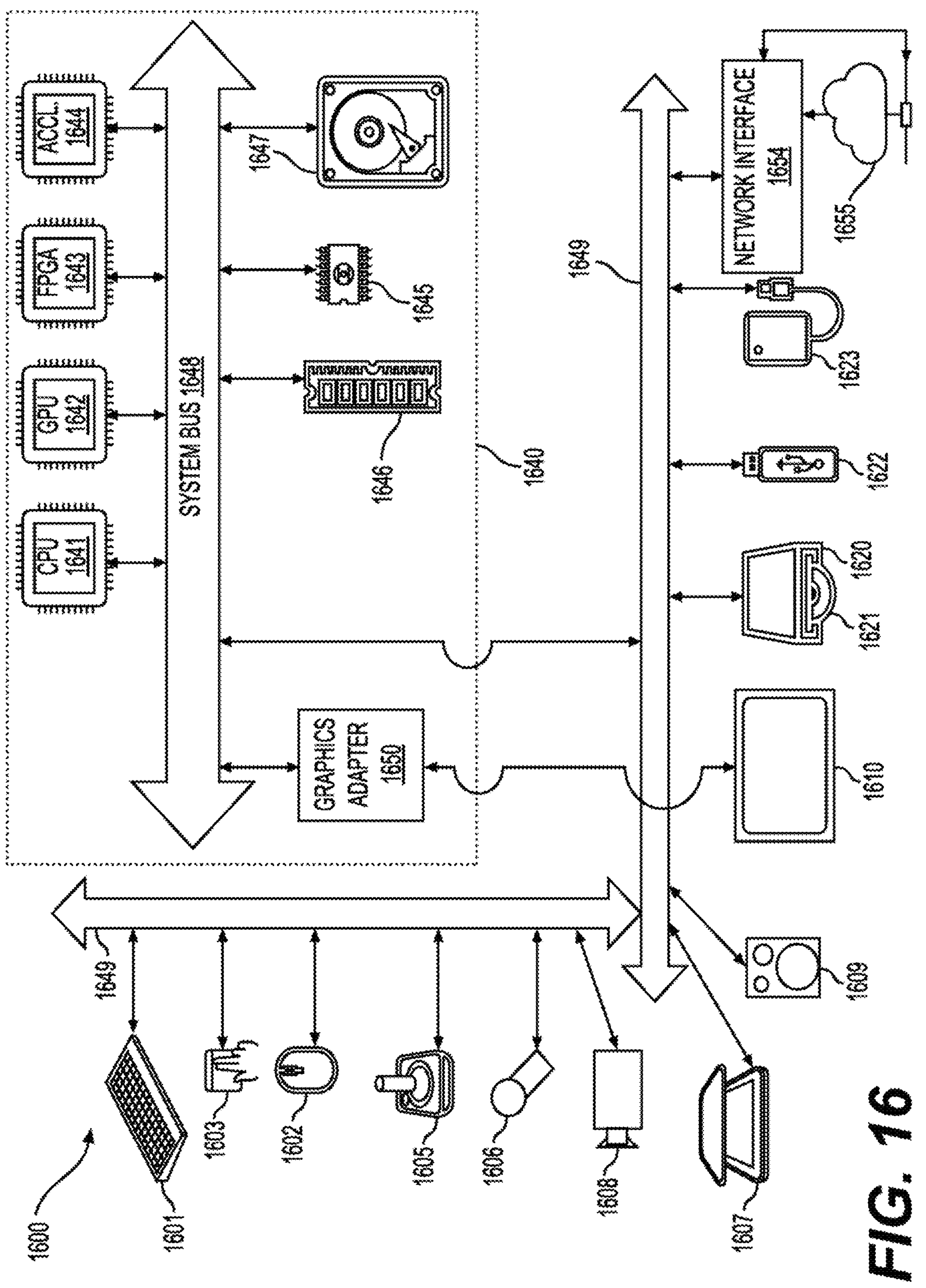
FIG. 16 is a schematic illustration of a computer system in accordance with an aspect.

The components shown in FIG. 16 for computer system (1600) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various aspects of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method for video decoding, the method including: receiving a bitstream including coded information of a current block in a first coding tree unit (CTU) that is predicted using samples in a current picture, the first CTU and a second CTU being processed in parallel; determining one of (i) a reference block of the current block in an allowed search range that is constrained for parallel processing of the first CTU and the second CTU in the current picture and (ii) an intra prediction mode of the current block based on a template that is adjacent to the current block that is constrained for parallel processing of the first CTU and the second CTU; and reconstructing the current block using the one of (i) the reference block of the current block and (ii) the intra prediction mode of the current block.

(2) The method of feature (1), in which the one of (i) the reference block of the current block and (ii) the intra prediction mode of the current block is the reference block in the allowed search range in the current picture. The reference block may be determined using one of an intra template matching prediction (IntraTMP) mode and an intra block copy (IBC) mode. The current block may be reconstructed using the reference block of the current block. The allowed search range of the current block in the first CTU may be constrained based on the first CTU and the second CTU being in two adjacent rows of the current picture and being separated by one CTU column.

(3) The method of feature (2), in which the first CTU in the current picture is indicated by a CTU coordinate [N, M], a CTU row is indicated by M, and a CTU column is indicated by N. A CTU at one of the top-most row and the right-most column in the current picture is indicated by [N+L, M−L], and the CTU at [N+L, M−L] is separated from the first CTU by L CTU columns and L CTU rows. When L is larger than 0, for a CTU row [M−i], the allowed search range of the current block in the first CTU is constrained to one or more CTUs that are to the left of a CTU at [N+i+1, M−i] where i is from 1 to L.

(4) The method of feature (2), in which the first CTU in the current picture is indicated by a CTU coordinate [N, M], and a CTU row is indicated by M, and a CTU column is indicated by N. A CTU at one of the top-most row and the right-most column in the current picture is indicated by [N+2L, M−L], and the CTU at [N+2L, M−L] is separated from the first CTU by 2L CTU columns and L CTU rows. When L is larger than 0, for a CTU row [M−i], the allowed search range of the current block in the first CTU is constrained to one or more CTUs that are to the left of a CTU at [N+2i, M−i] where i is from 1 to L.

(5) The method of feature (2), in which the first CTU in the current picture is indicated by a CTU coordinate [N, M], and a CTU row is indicated by M, and a CTU column is indicated by N. The allowed search range of the current block in the first CTU is constrained to one or more CTUs that are to the left of a CTU column [N+2] when the one or more CTUs are located above the CTU row M.

(6) The method of feature (2), in which the first CTU in the current picture is indicated by a CTU coordinate [N, M], and a CTU row is indicated by M, and a CTU column is indicated by N. The allowed search range of the current block in the first CTU is constrained to one or more CTUs that are below a CTU row [M−2] and to the left of a CTU column [N+2].

(7) The method of feature (2), in which the allowed search range of the current block in the first CTU is constrained based on one of a block width and a block height of the current block.

(8) The method of feature (2), in which the first CTU in the current picture is indicated by a CTU coordinate [N, M], a CTU row is indicated by M, and a CTU column is indicated by N, and the allowed search range of the current block in the first CTU is constrained to one or more CTUs that are the left of a CTU column [N+4] and below a CTU row [M−3].

(9) The method of feature (1), in which the one of (i) the reference block of the current block and (ii) the intra prediction mode of the current block is the intra prediction mode of the current block determined based on the template that is adjacent to the current block using one of template-based intra prediction mode derivation (TIMD) and decoder-side intra mode derivation (DIMD). The current block is reconstructed using the intra prediction mode of the current block. The template that is adjacent to the current block is constrained based on a number of at least one CTU column between the first CTU and the second CTU that are in two adjacent rows of the current picture.

(10) The method of feature (9), in which an initial template available to the one of the TIMD and the DIMD includes an initial top template. The template that is adjacent to the current block is constrained to samples to the left of a right-most portion of the initial top template. The initial template consists of the template and the right-most portion of the initial top template.

(11) The method of any of features (1) to (10), in which the allowed search range of the current block in the first CTU or the template that is adjacent to the current block is constrained based on a number of at least one CTU column between the first CTU and the second CTU that are in two adjacent rows of the current picture.

(12) The method of any of features (1) to (11), in which the coded information includes a high-level syntax element indicating the current block is to be reconstructed using the allowed search range of the current block in the first CTU or the template that is adjacent to the current block, and a high-level associated with the high-level syntax element is higher than a CTU level.

(13) A method for video encoding, the method including: determining one of (i) a reference block of a current block in an allowed search range that is constrained for parallel processing of a first coding tree unit (CTU) and a second CTU in a current picture and (ii) an intra prediction mode of the current block based on a template that is adjacent to the current block that is constrained for parallel processing of the first CTU and the second CTU, the current block in the first CTU being predicted using samples in the current picture; and encoding the current block using the one of (i) the reference block of the current block and (ii) the intra prediction mode of the current block.

(14) The method of features (13), in which the one of (i) the reference block of the current block and (ii) the intra prediction mode of the current block is the reference block of the current block in the allowed search range in the current picture. The reference block is determined using one of an intra template matching prediction (IntraTMP) mode and an intra block copy (IBC) mode. The current block is encoded using the reference block of the current block. The allowed search range of the current block in the first CTU is constrained based on the first CTU and the second CTU being in two adjacent rows of the current picture and being separated by one CTU column.

(15) The method of features (14), the first CTU in the current picture is indicated by a CTU coordinate [N, M], a CTU row is indicated by M, and a CTU column is indicated by N, a CTU at one of the top-most row and the right-most column in the current picture is indicated by [N+L, M−L], and the CTU [N+L, M−L] is separated from the first CTU by L CTU columns and L CTU rows. When L is larger than 0, for a CTU row [M−i], the allowed search range of the current block in the first CTU is constrained to the CTU at [N+i, M−i] and one or more CTUs that are to the left of a CTU at [N+i, M−i] where i is from 1 to L.

(16) The method of features (14), the first CTU in the current picture is indicated by a CTU coordinate [N, M], a CTU row is indicated by M, and a CTU column is indicated by N, a CTU at one of the top-most row and the right-most column in the current picture is indicated by [N+2L, M−L], and the CTU [N+2L, M−L] is separated from the first CTU by 2L CTU columns and L CTU rows. When L is larger than 0, for a CTU row [M−i], the allowed search range of the current block in the first CTU is constrained to one or more CTUs that are to the left of a CTU at [N+2i, M−i] where i is from 1 to L.

(17) The method of features (14), the first CTU in the current picture is indicated by a CTU coordinate [N, M], a CTU row is indicated by M, and a CTU column is indicated by N, and the allowed search range of the current block in the first CTU is constrained to one or more CTUs that are to the left of a CTU column [N+2] when the one or more CTUs are located above the CTU row M.

(18) The method of features (14), the first CTU in the current picture is indicated by a CTU coordinate [N, M], a CTU row is indicated by M, and a CTU column is indicated by N, and the allowed search range of the current block in the first CTU is constrained to one or more CTUs that are below a CTU row [M−2] and to the left of a CTU column [N+2].

(19) The method of features (13), the one of (i) the reference block of the current block and (ii) the intra prediction mode of the current block is the intra prediction mode of the current block determined based on the template that is adjacent to the current block using one of template-based intra prediction mode derivation (TIMD) and decoder-side intra mode derivation (DIMD). The current block is encoded using the intra prediction mode of the current block. An initial template available to the one of the TIMD and the DIMD includes an initial top template. The template that is adjacent to the current block is constrained to samples to the left of a right-most portion of the initial top template. The initial template consists of the template and the right-most portion of the initial top template.

(20) A method of processing visual media data, the method including: processing a bitstream of the visual media data according to a format rule, where the bitstream includes a syntax element indicating that a current block in a first coding tree unit (CTU) is predicted using samples in a current picture. The first CTU and a second CTU are processed in parallel. The format rule specifies that: determining one of (i) a reference block of the current block in an allowed search range that is constrained for parallel processing of the first CTU and the second CTU in the current picture and (ii) an intra prediction mode of the current block based on a template that is adjacent to the current block that is constrained for parallel processing of the first CTU and the second CTU is performed; and the current block is reconstructed using the one of (i) the reference block of the current block and (ii) the intra prediction mode of the current block.

(21) An apparatus for video decoding, including processing circuitry that is configured to perform the method of any of features (1) to (12).

(22) An apparatus for video encoding, including processing circuitry that is configured to perform the method of any of features (13) to (19).

(23) A non-transitory computer-readable storage medium storing instructions which when executed by at least one processor cause the at least one processor to perform the method of any of features (1) to (19).

What is claimed is:

1. A method for video decoding, the method comprising:

receiving a bitstream including coded information of a current block in a first coding tree unit (CTU) that is predicted using samples in a current picture, the first CTU and a second CTU in two adjacent rows of the current picture being processed in parallel and separated by one CTU column, the first CTU being indicated by a CTU coordinate [N, M], a CTU row being indicated by M, and a CTU column being indicated by N, the second CTU being indicated by a CTU coordinate [N+2, M−1];

determining one of (i) a reference block of the current block in an allowed search range that is constrained for parallel processing of the first CTU and the second CTU in the current picture and (ii) an intra prediction mode of the current block based on a template that is adjacent to the current block that is constrained for parallel processing of the first CTU and the second CTU; and reconstructing the current block using the one of (i) the reference block of the current block and (ii) the intra prediction mode of the current block, wherein when the one of (i) the reference block of the current block and (ii) the intra prediction mode of the current block is the reference block of the current block, the allowed search range of the current block in the first CTU does not include the second CTU at [N+2, M−1], and when the one of (i) the reference block of the current block and (ii) the intra prediction mode of the current block is the intra prediction mode of the current block, the template that is adjacent to the current block is constrained based on the one CTU column between the first CTU and the second CTU.

2. The method of claim 1, wherein the one of (i) the reference block of the current block and (ii) the intra prediction mode of the current block is the reference block of the current block in the allowed search range in the current picture determined using one of an intra template matching prediction (IntraTMP) mode and an intra block copy (IBC) mode; and the reconstructing the current block includes reconstructing the current block using the reference block of the current block.

3. The method of claim 2, wherein a CTU at one of the top-most row and the right-most column in the current picture is indicated by [N+L, M−L], the CTU at [N+L, M−L] being separated from the first CTU by L CTU columns and L CTU rows, L being larger than 0; and for a CTU row [M−i], the allowed search range of the current block in the first CTU consists of one or more CTUs that are to the left of a CTU at [N+i+1, M−i], i being from 1 to L.

4. The method of claim 2, wherein a CTU at one of the top-most row and the right-most column in the current picture is indicated by [N+2L, M−L], the CTU at [N+2L, M−L] being separated from the first CTU by 2L CTU columns and L CTU rows, L being larger than 0; and for a CTU row [M−i], the allowed search range of the current block in the first CTU consists of one or more CTUs that are to the left of a CTU at [N+2i, M−i], i being from 1 to L.

5. The method of claim 2, wherein the allowed search range of the current block in the first CTU consists of one or more CTUs that are to the left of a CTU column [N+2] when the one or more CTUs are located above the CTU row M.

6. The method of claim 2, wherein the allowed search range of the current block in the first CTU consists of one or more CTUs that are below a CTU row [M−2] and to the left of a CTU column [N+2].

7. The method of claim 2, wherein the allowed search range of the current block in the first CTU is further constrained based on one of a block width W and a block height H of the current block, when the allowed search range is further constrained based on the block width W, the right-most position of the allowed search range is (x+N×W), x is a horizontal coordinate of the current block, and N is a predefined integer, and when the allowed search range is further constrained based on the block height H, the top-most position of the allowed search range is (y+M×H), y is a vertical coordinate of the current block, and M is a predefined integer.

8. The method of claim 1, wherein the one of (i) the reference block of the current block and (ii) the intra prediction mode of the current block is the intra prediction mode of the current block determined based on the template that is adjacent to the current block using one of template-based intra prediction mode derivation (TIMD) and decoder-side intra mode derivation (DIMD); and the reconstructing the current block includes reconstructing the current block using the intra prediction mode of the current block.

9. The method of claim 8, wherein an initial template available to the one of the TIMD and the DIMD includes an initial top template;

the template that is adjacent to the current block is constrained to samples to the left of a right-most portion of the initial top template; and the initial template consists of the template and the right-most portion of the initial top template.

10. The method of claim 1, wherein the coded information comprises a high-level syntax element indicating the current block is to be reconstructed using the allowed search range of the current block in the first CTU or the template that is adjacent to the current block, and a high-level associated with the high-level syntax element is higher than a CTU level.

11. A method for video encoding, the method comprising:

determining one of (i) a reference block of a current block in an allowed search range that is constrained for parallel processing of a first coding tree unit (CTU) and a second CTU in a current picture and (ii) an intra prediction mode of the current block based on a template that is adjacent to the current block that is constrained for parallel processing of the first CTU and the second CTU, the current block in the first CTU being predicted using samples in the current picture, the first CTU and the second CTU being in two adjacent rows and separated by one CTU column, the first CTU being indicated by a CTU coordinate [N, M], a CTU row being indicated by M, and a CTU column being indicated by N, the second CTU being indicated by a CTU coordinate [N+2, M−1]; and encoding the current block using the one of (i) the reference block of the current block and (ii) the intra prediction mode of the current block, wherein when the one of (i) the reference block of the current block and (ii) the intra prediction mode of the current block is the reference block of the current block, the allowed search range of the current block in the first CTU does not include the second CTU at [N+2, M−1], and when the one of (i) the reference block of the current block and (ii) the intra prediction mode of the current block is the intra prediction mode of the current block, the template that is adjacent to the current block is constrained based on the one CTU column between the first CTU and the second CTU.

12. The method of claim 11, wherein the one of (i) the reference block of the current block and (ii) the intra prediction mode of the current block is the reference block of the current block in the allowed search range in the current picture determined using one of an intra template matching prediction (IntraTMP) mode and an intra block copy (IBC) mode; and the encoding the current block includes encoding the current block using the reference block of the current block.

13. The method of claim 12, wherein a CTU at one of the top-most row and the right-most column in the current picture is indicated by [N+L, M−L], the CTU [N+L, M−L] being separated from the first CTU by L CTU columns and L CTU rows, L being larger than 0; and for a CTU row [M−i], the allowed search range of the current block in the first CTU consists of one or more CTUs that are to the left of a CTU at [N+i+1, M−i], i being from 1 to L.

14. The method of claim 12, wherein a CTU at one of the top-most row and the right-most column in the current picture is indicated by [N+2L, M−L], the CTU [N+2L, M−L] being separated from the first CTU by 2L CTU columns and L CTU rows, L being larger than 0; and for a CTU row [M−i], the allowed search range of the current block in the first CTU consists of one or more CTUs that are to the left of a CTU at [N+2i, M−i], i being from 1 to L.

15. The method of claim 12, wherein the allowed search range of the current block in the first CTU consists of one or more CTUs that are to the left of a CTU column [N+2] when the one or more CTUs are located above the CTU row M.

16. The method of claim 12, wherein the allowed search range of the current block in the first CTU consists of one or more CTUs that are below a CTU row [M−2] and to the left of a CTU column [N+2].

17. The method of claim 11, wherein the one of (i) the reference block of the current block and (ii) the intra prediction mode of the current block is the intra prediction mode of the current block determined based on the template that is adjacent to the current block using one of template-based intra prediction mode derivation (TIMD) and decoder-side intra mode derivation (DIMD);

the encoding the current block includes encoding the current block using the intra prediction mode of the current block;

an initial template available to the one of the TIMD and the DIMD includes an initial top template;

the template that is adjacent to the current block is constrained to samples to the left of a right-most portion of the initial top template; and the initial template consists of the template and the right-most portion of the initial top template.

18. A non-transitory computer-readable storage medium storing instructions which when executed by a processor cause the processor to perform a method of encoding a bitstream comprising:

determining one of (i) a reference block of a current block in an allowed search range that is constrained for parallel processing of a first coding tree unit (CTU) and a second CTU in a current picture and (ii) an intra prediction mode of the current block based on a template that is adjacent to the current block that is constrained for parallel processing of the first CTU and the second CTU, the current block in the first CTU being predicted using samples in the current picture, the first CTU and the second CTU being in two adjacent rows and separated by one CTU column, the first CTU being indicated by a CTU coordinate [N, M], a CTU row being indicated by M, and a CTU column being indicated by N, the second CTU being indicated by a CTU coordinate [N+2, M−1];

encoding, in the bitstream, the current block using the one of (i) the reference block of the current block and (ii) the intra prediction mode of the current block; and transmitting the bitstream, wherein when the one of (i) the reference block of the current block and (ii) the intra prediction mode of the current block is the reference block of the current block, the allowed search range of the current block in the first CTU does not include the second CTU at [N+2, M−1], and when the one of (i) the reference block of the current block and (ii) the intra prediction mode of the current block is the intra prediction mode of the current block, the template that is adjacent to the current block is constrained based on the one CTU column between the first CTU and the second CTU.

* * * * *